(12) United States Patent
Diao et al.

(10) Patent No.: US 12,352,971 B2
(45) Date of Patent: Jul. 8, 2025

(54) AUGMENTED REALITY DISPLAY SYSTEM AND AR GOGGLE

(71) Applicant: Sichuan Longhua Film Co., Ltd., Mianyang (CN)

(72) Inventors: Ruimin Diao, Mianyang (CN); Yao Chang Wang, Zhubei (TW)

(73) Assignee: Sichuan Longhua Film Co., Ltd., Mianyang (CN)

( * ) Notice: Subject to any disclaimer, the term of this patent is extended or adjusted under 35 U.S.C. 154(b) by 614 days.

(21) Appl. No.: 17/724,471

(22) Filed: Apr. 19, 2022

(65) Prior Publication Data

US 2023/0176381 A1 Jun. 8, 2023

(30) Foreign Application Priority Data

Dec. 7, 2021 (CN) .......................... 202111484446.2

(51) Int. Cl.
*G02B 27/01* (2006.01)
*G02B 5/30* (2006.01)
*G02B 27/28* (2006.01)

(52) U.S. Cl.
CPC ....... *G02B 27/0172* (2013.01); *G02B 5/3016* (2013.01); *G02B 5/3025* (2013.01); *G02B 27/283* (2013.01)

(58) Field of Classification Search
CPC .............. G02B 27/0172; G02B 27/283; G02B 5/3016; G02B 5/3025; G02B 5/3083
USPC ........................................ 359/483.01, 489.07
See application file for complete search history.

(56) References Cited

U.S. PATENT DOCUMENTS

| | | | | |
|---|---|---|---|---|
| 4,007,979 A | * | 2/1977 | Coblitz | G02B 27/28 359/489.08 |
| 5,383,053 A | * | 1/1995 | Hegg | G02B 27/0101 359/485.05 |
| 5,966,242 A | * | 10/1999 | Yamanaka | G02B 27/286 359/627 |
| 2008/0013051 A1 | * | 1/2008 | Glinski | G02F 1/133528 348/E9.027 |
| 2020/0348522 A1 | * | 11/2020 | Xiao | G02B 5/3033 |
| 2020/0371362 A1 | * | 11/2020 | Xiao | G02B 27/283 |
| 2021/0208400 A1 | * | 7/2021 | Hong | G02B 27/283 |
| 2022/0382060 A1 | * | 12/2022 | Sato | G02B 27/0172 |

* cited by examiner

*Primary Examiner* — Ricky D Shafer

(57) ABSTRACT

An augmented reality display system includes an image display, a linear polarization optical splitter, a phase delay sheet, a circular polarization optical reflector and a linear polarization absorption component. The image display provides a first beam with a first linear polarization direction, which is reflected by the linear polarization optical splitter to the phase delay sheet. The phase delay sheet converts the first beam into a second beam with a first circular polarization direction and transmits it to the circular polarization optical reflector. The circular polarization optical reflector converts the second beam into a third beam with a second round polarization direction and reflects it to the phase delay sheet. The phase delay sheet converts the third beam into a fourth beam with a second linear polarization direction, which passes through the linear polarization optical splitter and the linear polarization absorption component to form an image.

7 Claims, 2 Drawing Sheets

AUGMENTED REALITY DISPLAY SYSTEM AND AR GOGGLE

FIELD OF THE INVENTION

The present invention relates to the technical field of augmented reality (AR), and more particularly to an augmented reality display system and an AR goggle.

BACKGROUND OF THE INVENTION

FIG. 1 is a schematic structural view of a conventional augmented reality display system commonly used for general AR goggles. As shown in FIG. 1, the augmented reality display system 10 includes a curved reflector 12, an optical splitter 14 and an image display 16. An image beam L transmitted from the image display 16 is firstly reflected by the optical splitter 14 to the curved reflector 12 and then is reflected and enlarged by the curved reflector 12. The enlarged image beam L passes through the optical splitter 14 and becomes a to-be-displayed image beam L' to be received by a human eye 18.

The optical splitter 14 and the mirror surface of the curved reflector 12 are plated with a reflective-and-transmissive film layer (not shown in the figure) for visible light. Both the transmittance and the reflectivity of the reflective-and-transmissive film layer on visible light are 50%, so only 50% of the energy is transmitted to the curved reflector 12 after the image beam L is reflected by the optical splitter 14, only 50% of the energy is transmitted to the optical splitter 14 after the reflection of the curved reflector 12, and the energy of the to-be-displayed image beam L' after passing through the optical splitter 14 is only 50% of the energy reflected and transmitted from the curved reflector 12. Thus, the energy of the to-be-displayed image beam L' finally received by the human eye 18 is only at most 12.5% (50%*50%*50%) of the energy of the image beam L transmitted from the image display 16. It can be seen that the light energy utilization rate is low when the existing augmented display system 10 displays a to-be-displayed image.

SUMMARY OF THE INVENTION

The present invention provides an augmented reality display system and an AR goggle, wherein the augmented reality display system has a high light energy utilization rate when displaying a to-be-displayed image.

The augmented reality display system provided by the present invention includes an image display, a linear polarization optical splitter, a phase delay sheet, a circular polarization optical reflector and a linear polarization absorption component. The linear polarization optical splitter is arranged at an output end of the image display. The linear polarization optical splitter is configured to reflect light with a first linear polarization direction and allow light with a second linear polarization direction to pass therethrough. The phase delay sheet is arranged between the linear polarization optical splitter and the circular polarization optical reflector. The linear polarization absorption component is arranged on one side of the linear polarization optical splitter away from the phase delay sheet. The linear polarization absorption component is configured to absorb light with the first linear polarization direction and allow light with the second linear polarization direction to pass therethrough. The image display is configured to provide a first image beam with the first linear polarization direction. The first image beam is reflected by the linear polarization optical splitter to the phase delay sheet. The phase delay sheet is configured to convert the first image beam into a second image beam with a first circular polarization direction, and the second image beam is transmitted to the circular polarization optical reflector. The circular polarization optical reflector is configured to reflect the second image beam into a third image beam with a second circular polarization direction and reflect the third image beam back to the phase delay sheet. The phase delay sheet is further configured to convert the third image beam into a fourth image beam with the second linear polarization direction. The fourth image beam passes through the linear polarization optical splitter and the linear polarization absorption component to form a to-be-displayed image. The circular polarization reflector reflects the second image beam into the third image beam with a reflectivity between 55% and 100%.

In one embodiment of the present invention, the first linear polarization direction is orthogonal to the second linear polarization direction. A phase difference between the first linear polarization direction and the first circular polarization direction is 45°. A phase difference between the second linear polarization direction and the second circular polarization direction is 45°.

In one embodiment of the present invention, the image display and the linear polarization optical splitter are arranged along a first direction. The linear polarization optical splitter, the phase delay sheet and the circular polarization optical reflector are arranged along a second direction.

In one embodiment of the present invention, a first external environment light enters the augmented reality display system from the first direction. Part of the first external environment light with the first linear polarization direction is absorbed by the linear polarization absorption component. Part of the first external environment light with the second linear polarization direction sequentially passes through the linear polarization absorption component and the linear polarization optical splitter, is reflected by the image display back to the linear polarization optical splitter, and passes through the linear polarization optical splitter and the linear polarization absorption component.

In one embodiment of the present invention, a second external environment light enters the augmented reality display system from the second direction. Part of the second external environment light with the second circular polarization direction sequentially passes through the circular polarization optical reflector, is transmitted to the phase delay sheet, and is converted by the phase delay sheet into light with the second linear polarization direction. The light with the second linear polarization direction passes through the linear polarization optical splitter and the linear polarization absorption component.

In one embodiment of the present invention, the second external environment light passes through the circular polarization optical reflector with a transmittance between 50% and 75%.

In one embodiment of the present invention, the second image beam is reflected into the third image beam with a reflectivity of 100%. The second external light passes through the circular polarization optical reflector with a transmittance of 50%.

In one embodiment of the present invention, the aforementioned augmented reality display system further includes a light transmitting lens, arranged on one side of the circular polarization optical reflector away from the phase delay sheet.

In one embodiment of the present invention, the circular polarization optical reflector includes a cholesterol liquid crystal layer. The reflectivity of the circular polarization optical reflector is adjusted by the cholesterol liquid crystal layer.

The AR goggle provided by the present invention includes the aforementioned augmented reality display system.

The augmented reality display system of the present invention uses a circular polarization optical reflector, so that 55% to 100% of the energy of the to-be-displayed image can be finally received by the human eye, and therefore the light energy utilization rate of the to-be-displayed image is increased. Meanwhile, due to the arrangement of the circular polarization optical reflector also increases the contrast ratio of the to-be-displayed image relative to the environment light, a user can have a higher viewing quality.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

Figure 1:
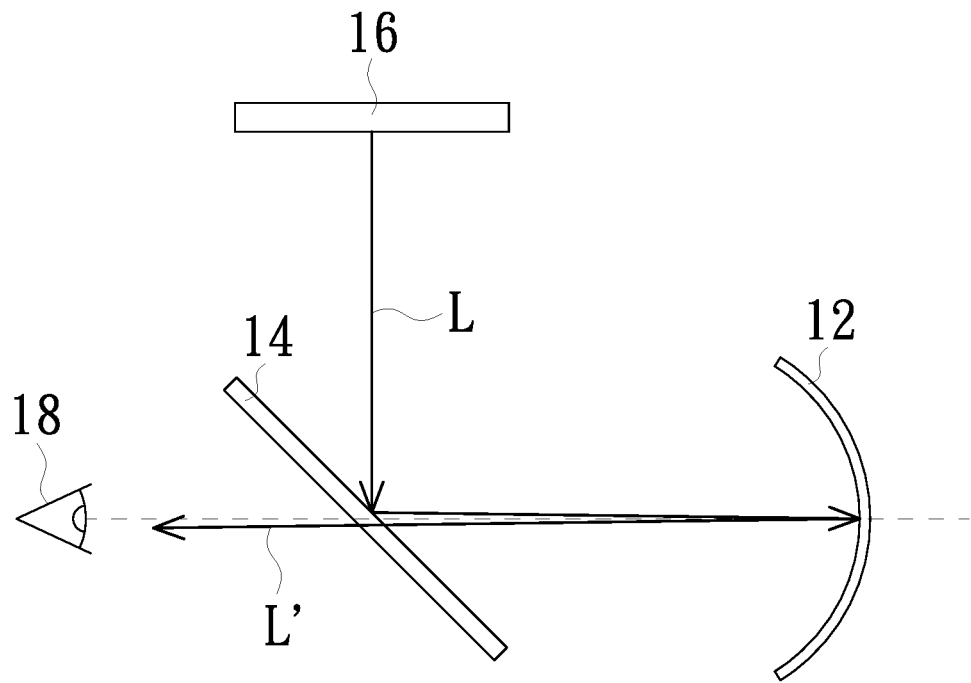
FIG. 1 is a schematic structural view of a conventional augmented reality display system.
Figure 2:
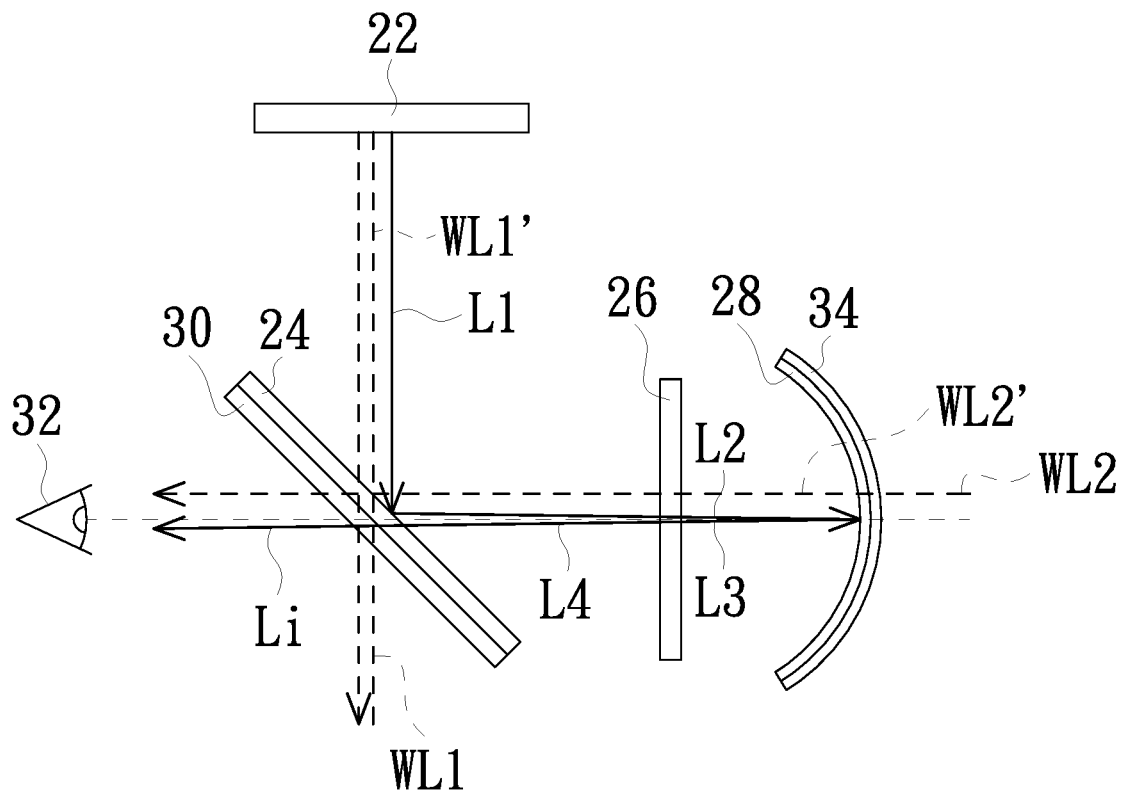
FIG. 2 is a schematic structural view of an augmented reality display system according to an embodiment of the present invention.
Figure 2:
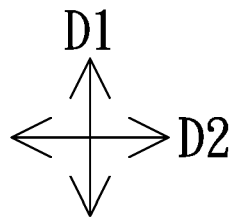

FIG. 2 is a schematic structural view of an augmented reality display system according to an embodiment of the present invention. As shown in FIG. 2, the augmented reality display system 20 includes an image display 22, a linear polarization optical splitter 24, a phase delay sheet 26, a circular polarization optical reflector 28 and a linear polarization absorption component 30. The image display 22 is configured to output a first image beam L1 with a first linear polarization direction. In one embodiment, the image display 22 is composed of, for example, a transmissive or reflective LOCS display source and an illumination source assembly capable of outputting collimated parallel illumination light. In another embodiment, the image display 22 is composed of, for example, an optical fiber scanning imaging system and a collimating system.

The linear polarization optical splitter 24 is arranged at an output end of the image display 22. In one embodiment, the image display 22 and the linear polarization optical splitter 24 are arranged along a first direction D1. The linear polarization optical splitter 24 is, for example, located below the image display 22. The linear polarization optical splitter 24 is configured to reflect light with the first linear polarization direction and allow light with a second linear polarization direction to pass therethrough, wherein the first linear polarization direction is orthogonal to the second linear polarization direction. The linear polarization optical splitter 24, the phase delay sheet 26 and the circular polarization optical reflector 28 are arranged along a second direction D2, wherein the second direction D2 is, for example, a direct view direction of a human eye 32. The phase delay sheet 26 is arranged between the linear polarization optical splitter 24 and the circular polarization optical reflector 28. The linear polarization absorption component 30 is arranged on one side of the linear polarization optical splitter 24 away from the phase delay sheet 26. The linear polarization absorption component 30 is configured to absorb light with the first linear polarization direction and allow light with the second linear polarization direction to pass therethrough. In one embodiment, the linear polarization absorption component 30 is, for example, sheet-shaped or film-shaped.

In one embodiment, the augmented reality display system 20 further includes a light transmitting lens 34, arranged on one side of the circular polarization optical reflector 28 away from the phase delay sheet 26. The circular polarization optical reflector 28 may include a cholesterol liquid crystal layer, and the circular polarization optical reflector 28 may be in a form of a film, a plate or a coating.

Continue to refer to FIG. 2. The first image beam L1 with the first linear polarization direction outputted by the image display 22 is reflected by the linear polarization optical splitter 24 to the phase delay sheet 26. The phase delay sheet 26 is, for example, a quarter wave plate. The first image beam L1 with the first linear polarization direction is converted by the phase delay sheet 26 into a second image beam L2 with a first circular polarization direction. In one embodiment, a phase difference between the first linear polarization direction and the first circular polarization direction is 45°. The second image beam L2 is transmitted to the circular polarization optical reflector 28 and is reflected by the circular polarization optical reflector 28 into a third image beam L3 with a second circular polarization direction and back to the phase delay sheet 26. The third image beam L3 reflected back by the circular polarization optical reflector 28 is converted by the phase delay sheet 26 into a fourth image beam L4 with the second linear polarization direction. In one embodiment, a phase difference between the second linear polarization direction and the second circular polarization direction is 45°. The fourth image beam 4 passes through the linear polarization optical splitter 24 and the linear polarization absorption component 30 to form a to-be-displayed image Li to be received by the human eye 32.

In the above embodiment of the augmented reality display system 20, optimally, the linear polarization optical splitter 24 can transfer 100% of the energy of the first image beam L1 to the phase delay sheet 26 without energy loss, so that the first image beam L1 is converted by the phase delay sheet 26 into the second image beam L2, and the second image beam L2 is then transmitted to the circular polarized light reflector 28. The circular polarization optical reflector 28 may adjust its reflectivity by the design of the cholesterol liquid crystal layer. In one embodiment, the circular polarization optical reflector 28 reflects the second image beam L2 into the third image beam L3 with a reflectivity between 55% and 100%, wherein the reflectivity is, for example, 55%, 60%, 70%, 80%, 90% and 100%. Preferably, the reflectivity of the circular polarization optical reflector 28 is 100%, which means that 100% of energy of the second image beam L2 may be converted into the third image beam L3 without energy loss. The third image beam L3 is converted by the phase delay sheet 26 into the fourth image beam L4. Optimally, 100% of the fourth image beam L4 can pass through the linear polarization optical splitter 24 and the linear polarization absorption component 30 without energy loss to arrive at the human eye 32. Therefore, the energy of the to-be-displayed image Li finally received by the human eye 32 may at most reach 100% of the energy of the first image beam L1 outputted by the image display 22. Thus, the augmented reality display system 20 of this embodiment has a high light energy utilization rate when displaying the to-be-displayed image Li.

Continue to refer to FIG. 2. In the first external environment light WL1 entering the augmented reality display system 20 from the first direction D1, part of the first external environment light WL1 with the first linear polarization direction is absorbed by the linear polarization absorption component 30; and part of the first external environment light WL1' with the second linear polarization direction sequentially passes through the linear polarization absorption component 30 and the linear polarization optical splitter 24, and is reflected by the image display 22 back to the linear polarization optical splitter 24, and passes through the linear polarization optical splitter 24 and the linear polarization absorption component 30. That is, the first external environment light WL1 does not enter the human eye 32, and therefore, the augmented reality display system 20 can effectively prevent the first external environment light WL1 from the first direction D1 from interfering with the human eye 32 to watch the to-be-displayed image Li.

Further, the second external environment light WL2 entering the augmented reality display system 20 from the second direction D2 passes through the light transmitting lens 34 and is transmitted to the circular polarization optical reflector 28. Part of the second external environment light WL2' with the second circular polarization direction sequentially passes through the circular polarization optical reflector 28, and is transmitted to the phase delay sheet 26, and is converted by the phase delay sheet 26 into light with the second linear polarization direction. Thus, the light with the second linear polarization direction passes through the linear polarization optical splitter 24 and the linear polarization absorption component 30 and is received by the human eye 32. In one embodiment, by the design of the cholesterol liquid crystal layer of the circular polarization optical reflector 28, the second external environment light WL2 can pass through the circular polarization optical reflector 28 with a transmittance between 50% and 75%. Preferably, 50% of the energy of the second external environment light WL2 from the second direction D2 can pass through the circular polarization optical reflector 28. Optimally, 100% of the energy of the second external environment light WL2' passing through the circular polarization optical reflector 28 can pass through the phase delay sheet 26, the linear polarization optical splitter 24 and the linear polarization absorption component 30 and is received by the human eye 32. Therefore, the energy of the second external environment light WL2' finally received by the human eye 32 after passing through the augmented reality display system 20 is 50% of the energy of the second external environment light WL2 entering from the second direction D2. Thus, the augmented reality display system 20 of this embodiment can increase the contrast ratio of the to-be-displayed image Li relative to the environment light.

In the augmented reality display system 20 provided by the embodiment of the present invention, when the second image beam L2 is reflected into the third image beam L3 with 100% reflectivity, the energy of the to-be-displayed image Li finally received by the human eye 32 may reach 100% of the energy of the first image beam L1 outputted by the image display 22. Compared with the light energy utilization rate (e.g., 12.5%) of the conventional augmented reality display system 10, on the premise of outputting the same image beam energy, the to-be-displayed image Li received by the human eye 32 by using the augmented reality display system 20 provided by the embodiment of the present invention is brighter, and therefore a high contrast ratio is achieved. Correspondingly, because the augmented reality display system 20 provided by the embodiment of the present invention has a higher light energy utilization rate, a to-be-displayed image Li by using the augmented reality display system 20 with the same brightness as that of the conventional augmented reality display system 10 can be obtained when the first image beam L1 outputted by the image display 22 has a lower energy. Thus, the augmented reality display system 20 provided by the embodiment of the present invention has the advantage of low power consumption. Furthermore, one embodiment of the present invention further provides an AR goggle, which includes the aforementioned augmented reality display system 20. In an actual implementation, the AR goggle may further include some components for connecting, fixing, assembling and wearing the augmented reality display system 20, and the invention is not limited thereto. Because including the aforementioned augmented reality display system 20, the AR goggle provided by the embodiment of the present invention has the beneficial effects of the aforementioned augmented reality display system 20, and no redundant detail is to be given herein.

According to the above, the augmented reality display system provided by the embodiment of the present invention uses a circular polarization optical reflector to replace a reflective-and-transmissive curved reflecting mirror surface commonly used in the general AR goggle, so that 55% to 100% of the energy of the to-be-displayed image can be finally received by the human eye, and therefore the light energy utilization rate of the to-be-displayed image is increased. Meanwhile, due to the arrangement of the circular polarization optical reflector also increases the contrast ratio of the to-be-displayed image relative to the environment light, a user can have a higher viewing quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An augmented reality display system, comprising: an image display, a linear polarization optical splitter, a phase delay sheet, a circular polarization optical reflector and a linear polarization absorption component, wherein the linear polarization optical splitter is arranged at an output end of the image display, the linear polarization optical splitter is configured to reflect light with a first linear polarization direction and allow light with a second linear polarization direction to pass therethrough, the phase delay sheet is arranged between the linear polarization optical splitter and the circular polarization optical reflector, the linear polarization absorption component is arranged on one side of the linear polarization optical splitter away from the phase delay sheet, and the linear polarization absorption component is configured to absorb light with the first linear polarization direction and allow light with the second linear polarization direction to pass therethrough, wherein the image display is configured to provide a first image beam with the first linear polarization direction, and the first image beam is reflected by the linear polarization optical splitter to the phase delay sheet, the phase delay sheet is configured to convert the first image beam into a second image beam with a first circular polarization direction, and the second image beam is transmitted to the circular polarization optical reflector, the circular polarization optical reflector is configured to reflect the second image beam into a third image beam with a second circular polarization direction and reflect the third image beam back to the phase delay sheet, the phase delay sheet is further configured to convert the third image beam into a fourth image beam with the second linear polarization direction, the fourth image beam passes through the linear polarization optical splitter and the linear polarization absorption component to form a to-be-displayed image, and the circular polarization reflector reflects the second image beam into the third image beam with a reflectivity between 55% and 100%, wherein the image display and the linear polarization optical splitter are arranged along a first direction, and the linear polarization optical splitter, the phase delay sheet and the circular polarization optical reflector are arranged along a second direction, wherein a first external environment light enters the augmented reality display system from the first direction, part of the first external environment light with the first linear polarization direction is absorbed by the linear polarization absorption component, and part of the first external environment light with the second linear polarization direction sequentially passes through the linear polarization absorption component and the linear polarization optical splitter, is reflected by the image display back to the linear polarization optical splitter, and passes through the linear polarization optical splitter and the linear polarization absorption component.

2. The augmented reality display system according to claim 1, wherein the first linear polarization direction is orthogonal to the second linear polarization direction, a phase difference between the first linear polarization direction and the first circular polarization direction is 45°, and a phase difference between the second linear polarization direction and the second circular polarization direction is 45°.

3. The augmented reality display system according to claim 1, wherein a second external environment light enters the augmented reality display system from the second direction, part of the second external environment light with the second circular polarization direction sequentially passes through the circular polarization optical reflector, is transmitted to the phase delay sheet, and is converted by the phase delay sheet into light with the second linear polarization direction, and the light with the second linear polarization direction passes through the linear polarization optical splitter and the linear polarization absorption component.

4. The augmented reality display system according to claim 3, wherein the second external environment light passes through the circular polarization optical reflector with a transmittance between 50% and 75%.

5. The augmented reality display system according to claim 4, wherein the second image beam is reflected into the third image beam with a reflectivity of 100%, and the second external light passes through the circular polarization optical reflector with a transmittance of 50%.

6. The augmented reality display system according to claim 1, further comprising a light transmitting lens, arranged on one side of the circular polarization optical reflector away from the phase delay sheet.

7. The augmented reality display system according to claim 1, wherein the circular polarization optical reflector comprises a cholesterol liquid crystal layer, and the reflectivity of the circular polarization optical reflector is adjusted by the cholesterol liquid crystal layer.

* * * * *